(12) United States Patent
Conte et al.

(10) Patent No.: US 8,508,498 B2
(45) Date of Patent: Aug. 13, 2013

(54) DIRECTION AND FORCE SENSING INPUT DEVICE

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 956 days.

(21) Appl. No.: 12/430,503

(22) Filed: Apr. 27, 2009

(65) Prior Publication Data

US 2010/0271325 A1  Oct. 28, 2010

(51) Int. Cl.
*G06F 3/045* (2006.01)

(52) U.S. Cl.
USPC .............................. 345/174; 345/156; 345/173

(58) Field of Classification Search
USPC .......................................... 345/156, 168, 174
See application file for complete search history.

(56) References Cited

U.S. PATENT DOCUMENTS

| | | | |
|---|---|---|---|
| 7,944,432 B2 * | 5/2011 | Taniguchi et al. | 345/156 |
| 2003/0122779 A1 * | 7/2003 | Martin et al. | 345/156 |
| 2004/0169636 A1 * | 9/2004 | Park et al. | 345/156 |

* cited by examiner

*Primary Examiner* — Abbas Abdulselam
*Assistant Examiner* — Shawna Stepp Jones
(74) *Attorney, Agent, or Firm* — Dorsey & Whitney LLP

(57) ABSTRACT

Systems, methods and devices for identifying characters for a display are generally described. An example system may include a processor, a memory coupled to the processor, and an input device coupled to the processor. The input device may include a plurality of input members, where one or more of the input members may have a plurality of characters associated therewith. The processor may be adapted to execute computer implemented instructions to identify an occurrence of a touch force being applied to an input member, determine a particular character from the plurality of characters that is associated with the applied touch force, and/or send the identified character to a display unit. The character may be determined based at least in part on the one or more properties of the applied touch force.

28 Claims, 6 Drawing Sheets

DIRECTION AND FORCE SENSING INPUT DEVICE

BACKGROUND

E-mailing and text messaging have become a large part of communication in the modern world. As such, keyboards/keypads for performing these activities have been provided on many types of mobile devices, such as cellular phones, personal digital assistants (PDAs), and the like. At the same time, these mobile devices have become smaller in size. Manufacturers of mobile devices have attempted to deal with providing e-mail and text message services on increasingly diminutive device keyboards by assigning several letters of the alphabet to a single key. This, however, may make reaching a desired letter time consuming and inefficient. For example, many current systems require multiple keypresses to select one of the letters assigned to a single key. This shortcoming may be alleviated, in part, by predictive software that has been developed to predict which of the letters a user is attempting to enter into a message. However, these predictions are often inaccurate and may lead to further inefficiency when they are incorrect and require manual correction by a user.

BRIEF DESCRIPTION OF THE FIGURES

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
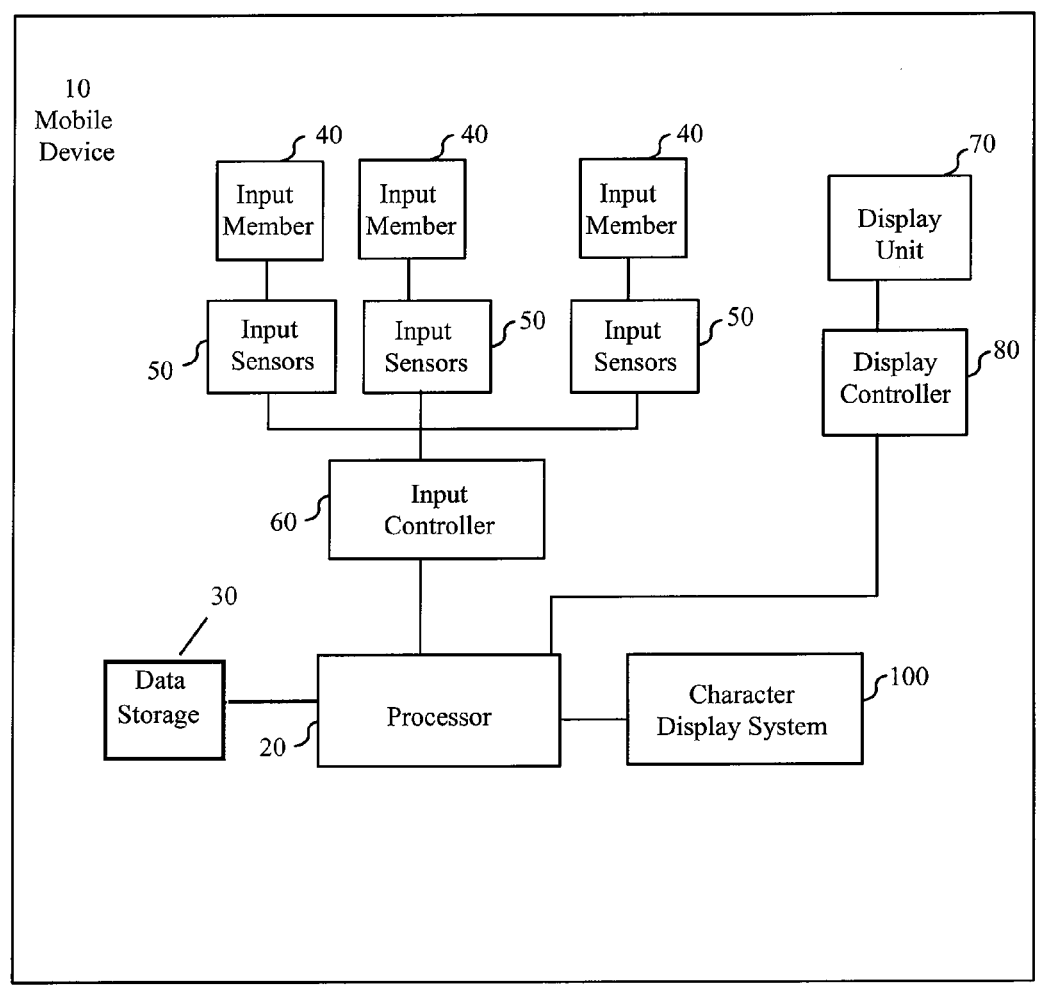
FIG. 1 depicts a block diagram of a mobile device in accordance with some examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein. It will also be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In some examples, the present disclosure may relate to systems and methods of displaying characters such as, for example, letters, numbers, symbols, and the like. More particularly, in an illustrative example, the present disclosure may relate to systems and methods for displaying characters on the basis of one or more properties of a touch force (e.g., a key stroke) applied to an in input member (e.g., a key). Such processes and methods may, for example, allow characters to be entered by a single key stroke, as opposed to the multiple key stroke approach currently employed in mobile devices, and thereby may reduce the number of key strokes a user is required to enter to express a word, phrase, and/or expression. Such processes and methods may simplify the writing of text messages, e-mail, entries into an address book or calendar, and the like. While the present disclosure is described with respect to examples where the systems and methods are employed in mobile devices, it is to be appreciated that the systems and methods of the present disclosure may be employed in any device having character display capabilities.

FIG. 1 depicts a block diagram of a mobile device 10 such as a cellular phone, PDA, and the like in accordance with some examples of the present disclosure. The mobile device 10 may include one or more of a processor 20, one or more data storage components 30, an input device comprising one or more input members 40, one or more input sensors 50 associated with each input member 40, an input controller 60, a display unit 70, a display controller 80, and a character display system 100, each of which are described in greater detail below.

It can be appreciated that many of the processes implemented in the mobile device 10 may be implemented in or controlled by software operating in a microprocessor, central processing unit (CPU), controller, digital signal processor (DSP) and/or an application specific integrated circuit (ASIC), collectively depicted as block 20 and termed as "processor". In various examples, more or fewer components may be included in processor 20.

In some examples, data may be stored in one or more data storage components 30, which may comprise any suitable computer memory such as, for example, a dynamic random access memory (DRAM) or non-volatile memory. A removable storage device, such as a Compact Flash (CF) card, Secure Digital (SD) card, or the like may further or alternatively be used to store data.

In some examples, the mobile device 10 may include an input device 35 including a plurality of input members 40 such as keys, pushbuttons, and the like. The input members 40 may be positioned adjacent one another on a portion of the mobile device 10 readily accessible to a user such that, collectively, the input members comprise a keyboard, keypad, or the like.

Figure 2:
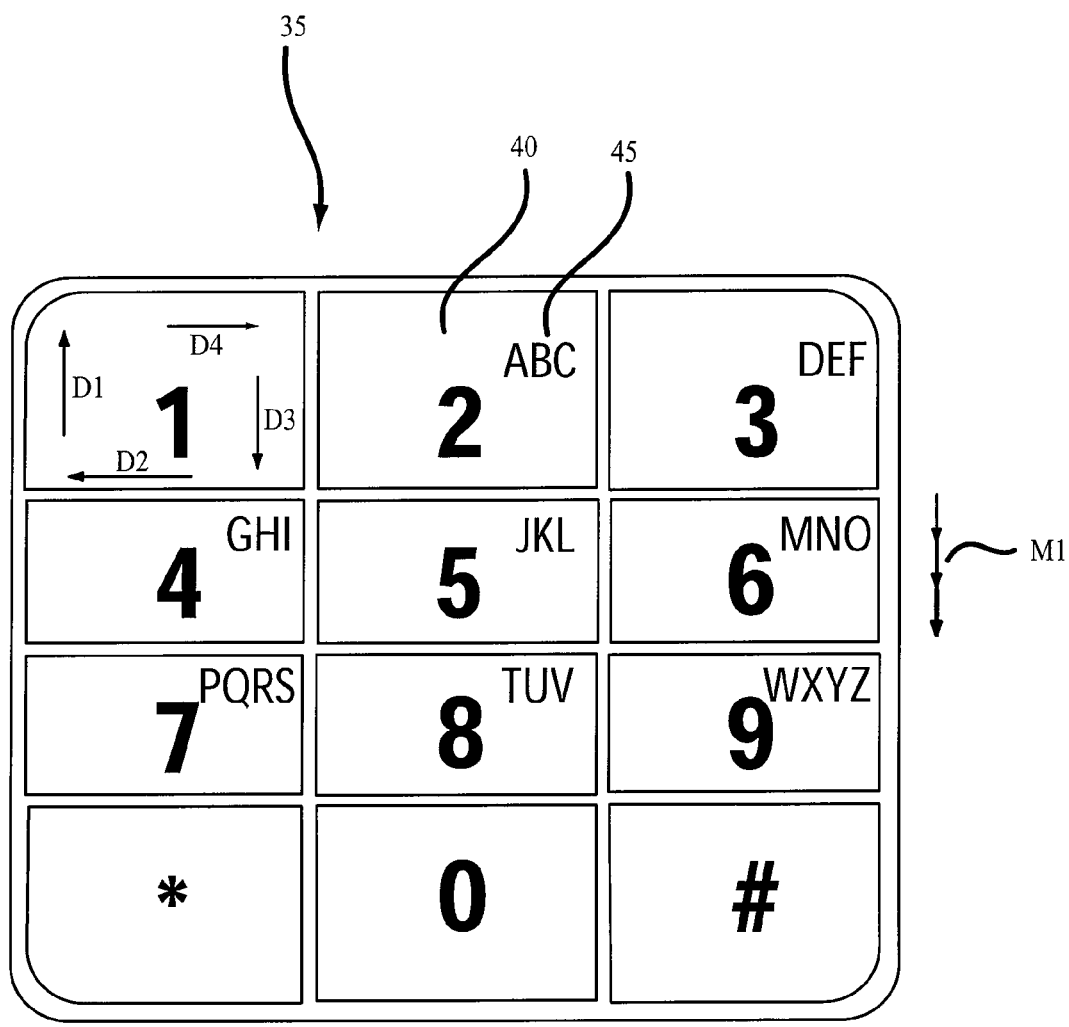
FIG. 2 depicts a schematic diagram of an input device in accordance with one or more examples.

FIG. 2 depicts a schematic diagram of an input device 35 in accordance with one or more example embodiments of the present disclosure. As shown, the input device 35 may include one or more input members 40 arranged in an array, the individual input members 40 of the array arranged in rows and columns. In some examples, each of the input members 40 may enable a user to effect functionality associated with the input member 40. For example, the input members 40 may be used to select one of a plurality of characters 45 associated with one or more of the input members 40, such as letters, numbers, symbols and the like.

As will be discussed in greater detail below, a character from the plurality of characters associated with an input member 40 may be selected based at least in part on one or more properties of a touch force applied to an input member such as a touch force magnitude, a touch force direction, and the like. Touch force directions may include, for example, an upward direction, leftward direction, downward direction, and rightward direction, represented as directional arrows D1, D2, D3, and D4, respectively. Alternatively, any touch force directions may be sensed. Touch force magnitudes, represented by force arrows M1, may include, for example, a slight force, a medium force, and a strong force, and may be sensed by the input sensors 50 and/or cause the input sensors 50 to be pressed through one or more sensor levels. Alternatively, any number and/or types of touch force magnitudes may be sensed.

Referring again to FIG. 1, in illustrative examples, one or more input sensors 50 may be associated with each of the input members 40. According to some examples, an array of input sensors 50 may be respectively associated with the input members 40. The input sensors 50 may comprise any type of sensor capable of detecting an applied force, for example, a piezoelectric sensor, capacitive displacement sensor, piezoresistive sensor, strain gauge sensor, accelerometer, or the like. Generally, the input sensors 50 may be used to sense touch forces applied to the input members 40 by, for example, a finger, stylus, or other object. Generally, the input sensors 50 may be provided as any suitable type of multi-directional sensor or sensor array. As described in more detail below, in various examples, the input sensors 50 may be used to sense properties of a touch force applied to an input member 40, such as the magnitude of the touch force that is applied to the input member, the direction in which a touch force is applied to the input member 40, the location at which the touch force is applied to the input member 40, the size of the object applying the touch force, or combinations thereof.

In various examples, the properties of a touch force applied to the input sensors 50 may be determined by an input controller 60. Input controller 60 may be separate from or part of the processor 20. The input sensor controller 60 may receive signals related to the component forces sensed by the different input sensors 30. These signals may then be analyzed by, for example, the processor 20 to determine which of a plurality of characters associated with each of the input members 40, for example, letters, numbers, symbols and the like, a user is attempting to select.

In one example, the mobile device 10 may include a display unit 70, for example, a liquid crystal display (LCD). The display unit 70 may be coupled to the processor 20 and display information received from the processor 20 via a display controller 80, such as a character selected via a touch force being applied to the input member 40. The display controller 80 may be part of or separate from the processor 20.

In some examples, a character display system 100 may be implemented in any computing and/or processing environments, including but not limited to computer software, firmware, device driver, digital electronic circuitry or computer hardware, or any combination of these. In one example, the character display system 100 can be integral to the mobile device 10 and may comprise a set of instructions running on the processor 20. In some examples, on the basis of data received from the input sensors 40 via the input controller 80, the character display system 100 may determine which of a plurality of characters associated with each of the input members, such as letters, numbers, symbols and the like a user is attempting to select.

Figure 3:
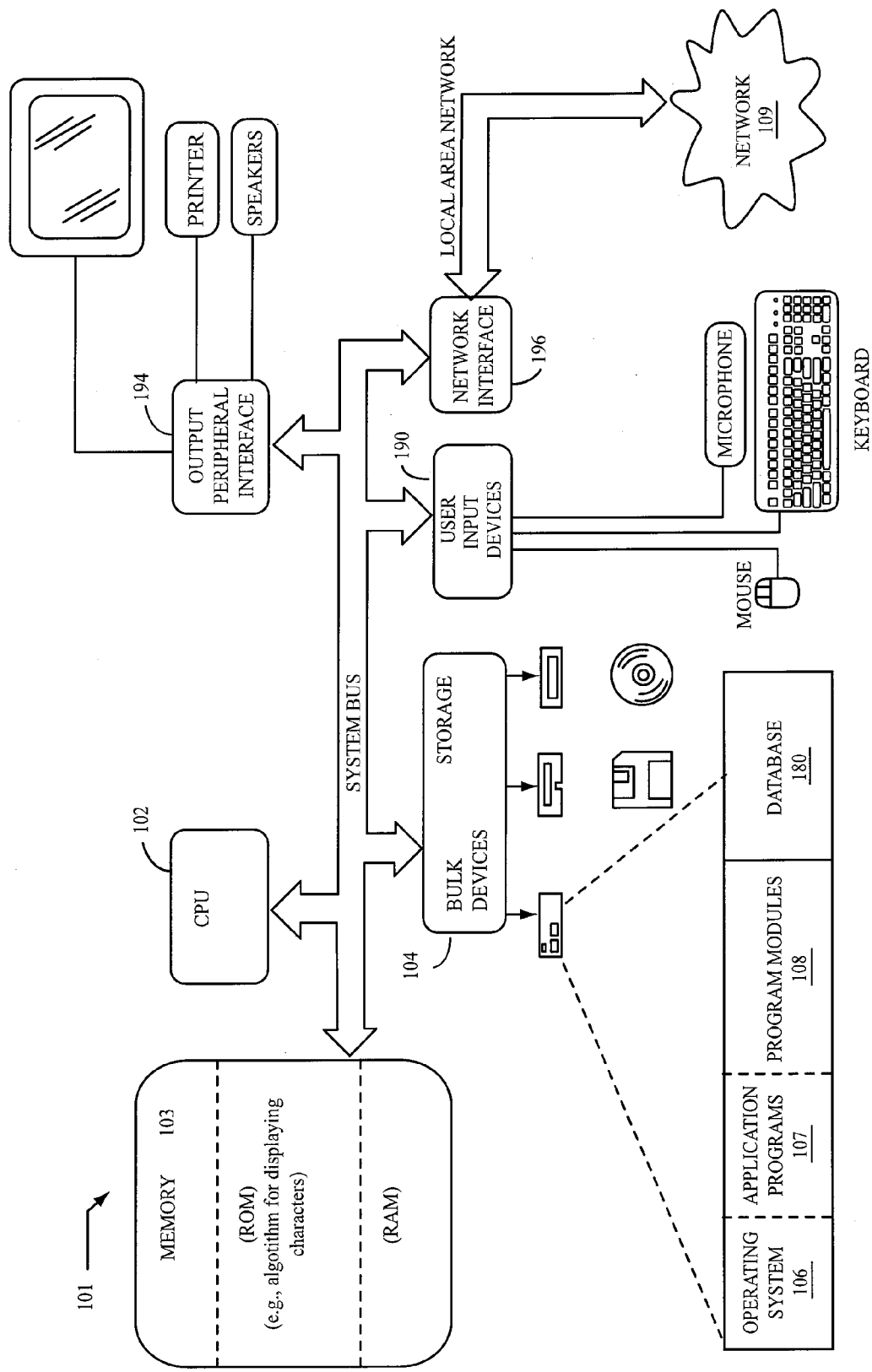
FIG. 3 depicts a schematic diagram of a suitable computing system environment for use with some examples.

With reference to FIG. 3, depicted is a suitable computing system environment for use with some examples of the present disclosure. The computing system of FIG. 3 includes a computer 101, including a central processing unit (CPU), also referred to as a processor, 102, main memory 103 and one or more bulk storage devices 104. The processor 102 may generally be of any desired configuration including, but not limited to, a microprocessor (μP), a microcontroller (μC), a digital signal processor (DSP), or any combination thereof. Thus, each processor 102 may include logic for executing program instructions as well as other functional blocks such as an arithmetic logic unit (ALU), a floating point unit (FPU), a digital signal processing (DSP) core, registers, accumulators, and so on. The main memory 103, which may be any suitable form of memory including, but not limited to, volatile memory such as random access memory (RAM), non-volatile memory such as read-only memory (ROM) and flash memory, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile. An algorithm for displaying characters may be provided in the main memory 103, such as, for example, in the ROM.

The bulk storage devices 104 and their associated computer storage media provide storage of computer readable instructions, data structures, program modules and other data for the computer 101. The bulk storage devices 104 may also include an operating system 106, application programs 107, program modules 108, and a database 180. The computer 101 further includes user input devices 190 through which a user may enter commands and data. The user input devices 190 may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to the processor 102 through a user input interface that is coupled to a system bus, but may be coupled by other interface and bus structures, such as a parallel port, game port or a universal serial bus (USB). Computers such as computer 101 may also include other peripheral output devices such as speakers, which may be coupled through an output peripheral interface 194 or the like.

The computer 101 may operate in a networked environment using logical connections to one or more computers, such as a remote computer coupled to network interface 196. The remote computer may be a personal computer, a server, a router, a network PC, a peer device or other common network node, and may include many or all of the elements described above relative to the computer 101. The remote computer may be considered the other of the client or the server depending on the designation of the computer 101. Networking environments are commonplace in offices, enterprise-wide area networks (WAN), local area networks (LAN), intranets and the Internet. Source and destination machines need not be connected by a network 109 or any other means, but instead, data may be migrated via any media capable of being written by the source platform and read by the destination platform or platforms. When used in a LAN or WLAN networking environment, the computer 101 may be coupled to the LAN through a network interface 196 or an adapter. When used in a WAN networking environment, the computer 101 may include a modem or other means for establishing communications over the WAN, such as the Internet or network 109. It will be appreciated that other means of establishing a communications link between the computers may be used.

Referring again to FIG. 2, in illustrative examples, the input members 40 may be arranged as a keypad, such as those commonly employed in cellular phones, PDAs, and the like, comprising at least input keys 0-9, for example. One or more of the input members 40 may have associated with a plurality of characters such as, for example, letters and/or symbols. For example, the "2" key may correspond to the letters "A", "B", and "C".

In some examples, properties of a touch force which may be sensed by input sensors 50 may include the magnitude of the touch force applied to an input member 40. In one example, the magnitude of the touch force may be compared to one or more predetermined magnitudes to determine which a plurality of characters associated with the input member 40 may be displayed to the display unit 70. For example, referring back to the above example for a "2" key, a touch force applied to the key less than a first predetermined magnitude (a "slight force") may correspond to the letter "A", a touch force applied to the key that is greater than the first predetermined magnitude and less than a second predetermined magnitude (a "medium force") may correspond to the letter "B", and a touch force applied to the key that is greater than the second predetermined magnitude (a "strong force") may correspond to the letter "C".

Properties of a touch force which may be sensed by input sensors 50 may also include the angle of the touch force. In illustrative examples, each of the input sensors 50 may be positioned as an array relative to their associated input member 40 such that each of the input sensors 50 of the array may individually detect applied touch forces. That is, each input sensor 50 of an array may, individually, detect a touch force that is directed to a specific area of the input member 40. In some examples, the individual forces detected by the input sensors 50 of an array may be used to determine a force gradient of the input sensor array.

The force gradient may be mapped to a plane to determine the direction of the touch force applied to the input member 40 (i.e., angle of a user's finger). The direction of the touch force may be used to determine which of a plurality of characters associated with the input member 40 will be displayed on the display unit 70. For example, again referring back to the above example for a "2" key, a touch force applied in an upward direction may correspond to the letter "A", a touch force applied in the leftward direction may correspond to the letter "B", and a touch force applied in the downward direction may correspond to the letter "C".

In further examples, properties of a touch force which may be sensed by input sensors 50 may include the type of finger used to apply the touch force (e.g., thumb, index finger, ring finger, etc.). In one example, the particular finger used to apply the touch force may be determined on the basis of the force gradient sensed by an input sensor 50. A touch force applied with a particular type of finger may correspond to force gradient which is different from the force gradients corresponding to touch forces applied from other types of fingers. Referring once again back to the above example for a "2" key, a touch force applied with a thumb may correspond to the letter "A", a touch force applied with an index finger may correspond to the letter "B", and a touch force applied with the ring finger may correspond to the letter "C".

As an initial matter, in some examples, one or more touch force properties may be assigned to each of the plurality of characters associated with an input member 40, hereinafter referred to as pre-stored reference properties, and stored to the data storage 30. For example, pre-stored reference properties that may be assigned to each of the plurality of characters of an input member 40 include a touch force magnitude range, a touch force direction, a size of object used to apply the touch force, and/or a type of finger used to apply the touch force. Alternatively, any properties of a touch force may be assigned to each of the plurality of characters and stored to the data storage component 30.

In illustrative examples, character display system 100 may be provided with interactive software for detecting/learning characteristics, habits and/or trends relating to touch forces applied by particular users. In one example, the detecting/learning software may include a set of interactive lessons, communicated via display unit 70, for example, which prompt users to apply touch forces to the input members 40, and subsequently store one or more properties of the applied touch forces, hereinafter referred to as detected reference properties, to the data storage 30. For example, a user may be prompted to apply touch forces which will correspond to a slight force, a medium force, and a strong force, and such measured forces may be stored to the database 30 (i.e., the first predetermined magnitude and the second predetermined magnitude may be set by a user). As a further example, a user may be prompted to apply touch forces with several different fingers, and the force gradients corresponding to each finger may be stored to the data storage 30. Alternatively, the detecting/learning software may detect and store any properties of an applied touch force. As will be discussed in more detail below, detected reference properties may be used in conjunction with or in lieu of pre-stored reference properties to determine which of the plurality of characters a user is attempting to select.

In some examples, the character display system 100 may include interactive training software for instructing users of a mobile device 10 regarding the properties of touch forces that will allow for selection of one of a plurality of characters associated with each input member 40. In one embodiment, the training software may include a set of interactive lessons, communicated via display unit 70, for example, which prompt users to apply touch forces to the input members 40, and subsequently provide feedback with respect to the properties of the applied touch force. For example, users may be prompted to apply a touch force to an input member 40 and then be provided with feedback regarding the magnitude of the applied touch force (e.g., whether the applied touch force constituted a slight force, medium force, strong force, etc.) Alternatively, users may be provided with feedback regarding any touch force properties.

Figure 4:
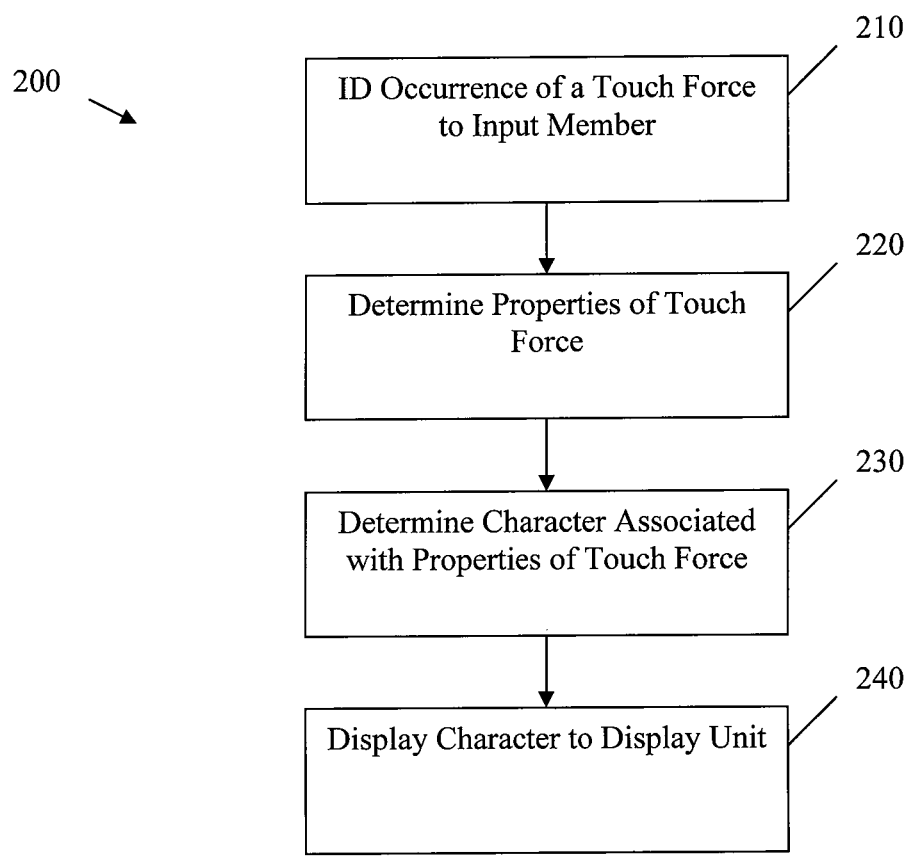
FIG. 4 depicts a process flow diagram for a character display system in accordance with some examples.

FIG. 4 depicts a process flow diagram for a character display system 200 in accordance with some examples of the present disclosure. Generally, the character display system 200 may analyze touch force data received from input sensors 50 to determine which of a plurality of characters such as, for example, letters, numbers, symbols, associated with an input members a user is attempting to select. The character display system 200 may be implemented, for example, in the mobile device 10 described above with respect to FIG. 1.

In some examples, the occurrence of a touch force being applied to an input member 40 may be identified (block 210). After a touch force being applied to an input member 40 is identified (block 210), one or more properties of the touch force may be determined (block 220). As described above, properties of the applied touch force may include alone or more of the following properties: a direction in which a touch force is applied, a magnitude of the touch force, a location of the touch force, a size of the object applying the touch force, a type of finger applying the touch force, or some other similar properties.

In various examples, after the properties of the applied touch force have been determined (block 220), the character display system 100 may determine a character, of the plurality of characters assigned to the input member 40, which is associated with the applied touch force (block 230). In one example, the character associated with the applied touch force may be determined by comparing one or more properties of the applied touch force with the pre-stored reference properties and/or the detected reference properties stored to the data storage 30. For example, if the property of the applied touch force is the magnitude of the touch force, the applied touch force magnitude may be compared to the first predetermined magnitude and the second predetermined magnitude to determine if the applied touch force constitutes a slight force, a medium force, or a strong force. If, for example, the applied touch force is a slight force, the character display system may associate the character assigned to a slight force with the applied touch force. As a further example, if the property of the applied touch force is the direction of the touch force, the applied touch force direction may be compared to the touch force directions stored to the data storage 30. If, for example, the applied touch force direction is upward, the character display system may associate the character assigned to the upward direction with the applied touch force. The foregoing process may be carried out using any touch force properties discussed herein, or known by those skilled in the art having read the present disclosure.

In illustrative examples, after determining the character associated with the touch force properties (block 230), the character associated with the touch force properties may be displayed on the display unit 70 (block 240).

In some examples, in addition to touch force properties, character display system 200 may further employ predictive software in determining which of the plurality of characters assigned to an input member to display. Generally, the predictive software may, as keys are pressed, employ an algorithm that searches a dictionary for a list of possible words that match the keypress combination, and display the most probable choice. Suitable predictive software for use with the systems and methods of the present disclosure includes T9®, iTap®, and eZiText®. Alternatively, and known predictive text software may be employed.

Figure 5:
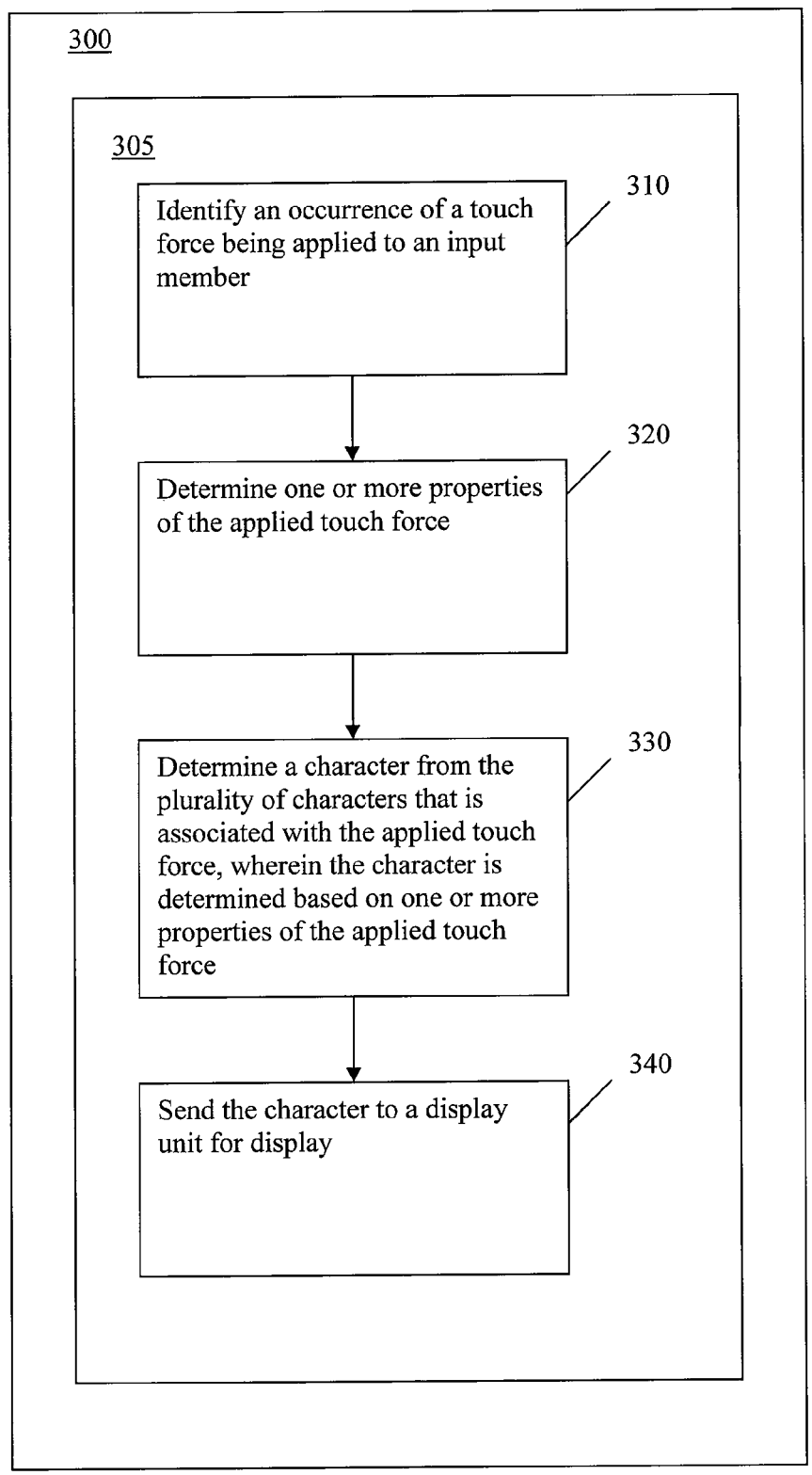
FIG. 5 depicts a schematic of a system for performing a method of displaying characters in accordance with one or more examples.

FIG. 5 depicts a schematic of a system 300 for performing a method of displaying characters in accordance with one or more examples of the present disclosure. In one particular example, a system 300 may include a processor 305 configured for performing an example of a method for managing data center tasks. In other examples, various steps or portions of various steps of the method may be performed outside of the processor 305. In various examples, the method may include identifying an occurrence of a touch force being applied to an input member, where one or more of the input members each have a plurality of characters associated therewith (block 310). The method may then include determining one or more properties of the applied touch force (block 320). Next, the method may include determining a character of the plurality of characters associated with the applied touch force, where the character is determined based at least in part on the one or more properties of the applied touch force (block 330). Finally, the method may include sending the character to a display unit for display (block 340).

Figure 6:
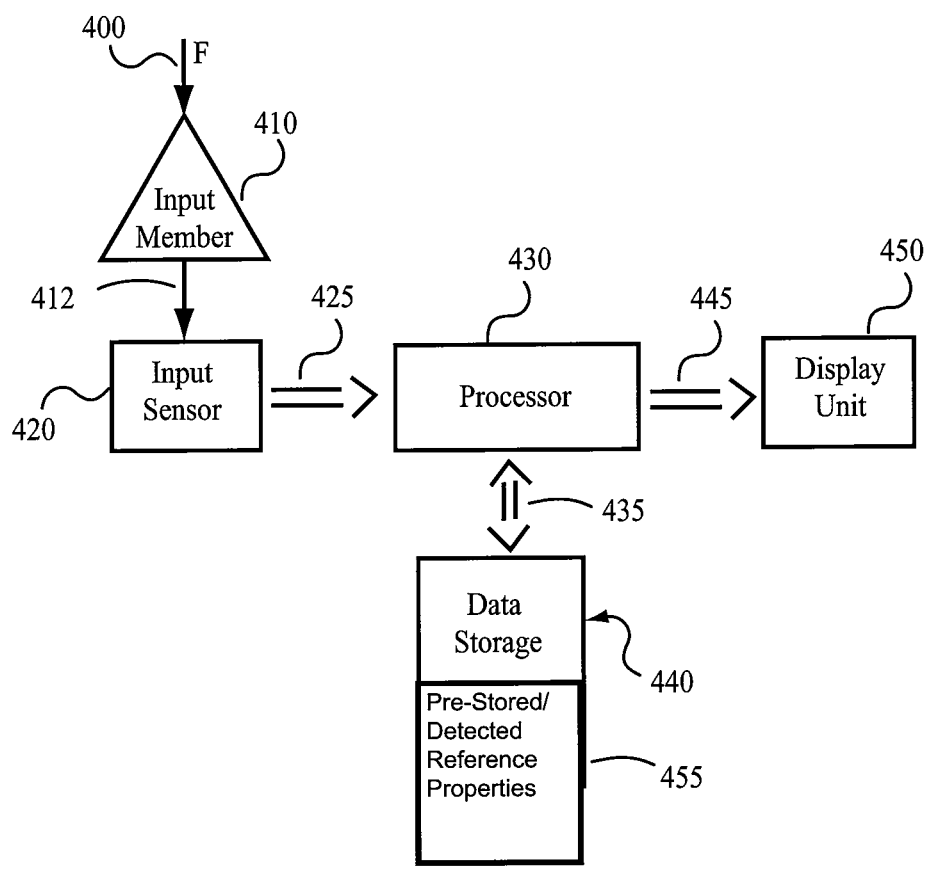
FIG. 6 depicts a schematic diagram of a data flow for a character display system in accordance with at least some examples.

FIG. 6 depicts a schematic diagram of data flow for a character display system in accordance with at least some examples of the present disclosure. An occurrence of a touch force 400 may be applied to input members 410, which may be sensed by one or more input sensors 420 via a coupling 412 such as a mechanical or other connection. The input sensors 420 may sense magnitude of the applied touch force and/or a direction of the applied touch force. A processor 430 may receive signals (e.g., sense signals) related to the applied touch force from the input sensors 420 communicated via a suitable data bus 425.

The processor 430 may, in some examples, include an input controller. The processor 430 may determine one or more properties of the applied touch force. The processor 430 may also determine a character of the plurality of characters that is associated with the applied touch force, with possible use of information of information received from a data storage 440 communicated via a data bus or memory bus 435.

The data storage 440 may include information relating to one or more pre-stored reference properties or detected reference properties, both 455. Determining the character of the plurality of characters may include comparing one or more properties of the applied touch force with the pre-stored reference properties and/or detected reference properties.

The character may then be sent via data bus 445 for display to a display unit 450. It is to be appreciated that any or all of the elements described with respect to FIG. 6 may or may not relate to the same elements discussed with respect to previous examples.

The foregoing describes various examples of systems and methods of displaying characters. Following are specific examples of systems and methods of displaying characters. These are for illustration only and are not intended to be limiting.

The present disclosure generally relates to systems for displaying characters. The systems may include a processor, a memory coupled to the processor, and an input device having a plurality of input members. In some described examples, each of two or more of the input members may have a plurality of characters associated therewith. In further described examples, the processor may be adapted to execute computer implemented instructions to identify an occurrence of a touch force being applied to an input member, determine one or more properties of the applied touch force, determine a character from the plurality of characters that is associated with the applied touch force, where the character is determined based at least in part on one or more properties of the applied touch force, and display the character to a display unit.

The present disclosure also generally relates to methods for displaying characters using a mobile device including an input device comprising a plurality of input members, where each of two or more of the input members have a plurality of characters associated therewith, is disclosed. The method may include identifying an occurrence of a touch force being applied to an input member, determining one or more properties of the applied touch force, determining a character from the plurality of characters that is associated with the applied touch force, where the character is determined based at least in part on the one or more properties of the applied touch force, and displaying the character to a display unit.

The present disclosure further generally relates to digital storage media having code provided thereon for programming one or more processors of a mobile device including an input device comprising a plurality of input members to perform procedures for displaying characters. In various described examples each of two or more of the input members have a plurality of characters associated therewith. In further described examples, the procedure may include identifying an occurrence of a touch force being applied to an input member, determining one or more properties of the applied touch force, determining a character from the plurality of characters that is associated with the applied touch force, where the character is determined based at least in part on the one or more properties of the applied touch force, and displaying the character to a display unit.

The present disclosure is not to be limited in terms of the particular examples described in this application, which are intended as illustrations of various aspects. Many modifications and variations may be made without departing from its spirit and scope, as will be apparent to those skilled in the art in light of the present disclosure. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity. It will be understood by those skilled the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

The herein described subject matter sometimes illustrates different components contained within, or coupled with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for displaying characters, comprising:
    a processor;
    a memory coupled to the processor; and
    an input device coupled to the processor and having a first plurality of input members, wherein a plurality of characters are associated with each input member of the first plurality of input members to allow input of any one of the plurality of characters by applying a touch force within a same area of the input member;
    wherein the processor is adapted to execute computer-implemented instructions to:
    identify an occurrence of the touch force being applied to an input member;
    determine one or more properties of the applied touch force;
    select a particular character from the plurality of characters associated with the input member based at least in part on the one or more properties of the applied touch force, wherein the one or more properties of the applied touch force include a direction of the applied touch force, the processor further adapted to execute computer-implemented instructions to select a first character in response to the applied touch force having a first direction as applied to one of the plurality of input members and select a second character in response to the applied touch force having a second direction as applied to the same one of the plurality of input members; and
    display the particular character to a display unit.

2. The system of claim 1, wherein the system further comprises a display unit coupled to the processor, and wherein the processor is further adapted to execute computer-implemented instructions to send the particular determined character to the display unit.

3. The system of claim 1, wherein the one or more properties of the applied touch force further includes a magnitude of the applied touch force.

4. The system of claim 3, wherein the processor is further configured to compare the magnitude of the applied touch force to one or more reference magnitude ranges, wherein each of the one or more reference magnitude ranges corresponds to a character of the plurality of characters associated with the input member.

5. The system of claim 1, wherein the one or more properties of the applied touch force further includes a type of finger used to apply the touch force.

6. The system of claim 1, wherein determining the particular character from the plurality of characters that is associated with the applied touch force comprises comparing one or more properties of the applied touch force with pre-stored reference properties.

7. The system in claim 6, wherein the pre-stored reference properties are stored in the memory for retrieval by the processor.

8. The system of claim 6, wherein each of the plurality of characters associated with each of the input members is assigned to the one or more pre-stored reference properties or the one or more detected reference properties.

9. The system of claim 6, wherein the pre-stored reference properties include a first magnitude range comprising force magnitudes less than or equal to a first predetermined force magnitude, a second magnitude range comprising force magnitudes greater than the first predetermined force magnitude and less than a second predetermined force magnitude, and a third magnitude range comprising force magnitudes greater than or equal to the second predetermined force magnitude.

10. The system of claim 6, wherein the pre-stored reference properties include touch force directions.

11. The system of claim 1, wherein determining the particular character from the plurality of characters that is associated with the applied touch force comprises comparing one or more properties of the applied touch force with detected reference properties.

12. The system in claim 11, wherein the detected reference properties are stored in the memory for retrieval by the processor.

13. The system of claim 11, wherein the detected reference properties are programmable by a user.

14. The system of claim 1, wherein the plurality of input members are arranged in rows and columns on the input device.

15. The system of claim 1, wherein the one or more properties of the applied touch force include a size of the object applying the touch force.

16. The system of claim 1, wherein the processor is adapted to execute computer-implemented instructions to select a first character of the plurality of characters in response to the applied touch force having a first magnitude as applied to one of the plurality of input members and wherein the processor is further adapted to execute computer-implemented instructions to select a second character of the plurality of characters in response to the applied touch force having a second magnitude as applied to the same one of the plurality of input members.

17. The system of claim 1, wherein one or more of the first plurality of input members includes an array of input sensors, each of the input sensors of the array of input sensors being configured to individually detect a touch force that is directed to a specific area of the input member.

18. The system of claim 1, wherein the input member is operable to detect a force gradient across one or more of the input members and wherein the processor is further adapted to execute computer-implemented instructions to determine the direction of the touch force based on the force gradient.

19. The system of claim 1, wherein three or more characters are associated with at least one input member from the first plurality of input members.

20. A method for identifying characters for display on a mobile device including an input device comprising a plurality of input members, wherein each of two or more of the input members have a plurality of characters associated therewith, the method comprising:
   sensing an occurrence of a touch force being applied to an input member;
   determining a direction of the applied touch force;
   comparing the direction of the applied touch force with a plurality of reference touch force directions;
   determining a particular character from the plurality of characters associated with the input member based, at least in part, on the comparison of the direction of the applied touch force with the plurality of reference touch force directions, the determining including selecting a first character in response to the applied touch force having a first direction as applied to the input member and selecting a second character in response to the applied touch force having a second direction as applied to the input member; and
   sending the particular character to a display unit for display on the mobile device.

21. The method of claim 20, wherein determining the particular character from the plurality of characters associated with the input member further comprises comparing the direction of the applied touch force with pre-stored reference directions or detected reference directions.

22. The method of claim 20, wherein each of the plurality of characters associated with each two or more of the input members is assigned to the one or more of the plurality of reference touch force directions.

23. The method of claim 20, further comprising determining a magnitude of the applied touch force, wherein the plurality of reference force magnitude ranges includes a first magnitude range comprising force magnitudes less than or equal to a first predetermined force magnitude, a second magnitude range comprising force magnitudes greater than the first predetermined force magnitude and less than a second predetermined force magnitude, and a third magnitude range comprising force magnitudes greater than or equal to the second predetermined force magnitude.

24. Non-transitory digital storage media having computer-executable instructions provided thereon for programming one or more processors of a mobile device to implement a procedure, the mobile device including a display unit and an input device, the input device comprising a plurality of input members, to perform a procedure for displaying characters, wherein each of two or more of the input members have a plurality of characters associated therewith, the procedure comprising:
   identifying an occurrence of a touch force being applied to an input member of the plurality of input members arranged in rows and columns on the input device;
   determining one or more properties of the applied touch force including determining the direction of the applied touch force;
   determining a particular character from the plurality of characters associated with the input member, wherein the character is determined based at least in part on the direction of the applied touch force, the determining including selecting a first character in response to the applied touch force having a first direction as applied to the input member and selecting a second character in response to the applied touch force having a second direction as applied to the input member; and
   sending the character to a display unit.

25. The procedure of claim 24, wherein determining the one or more properties of the applied touch force further includes determining a magnitude of the applied touch force.

26. The procedure of claim 24, wherein determining a character from the plurality of characters that is associated with the applied touch force includes comparing the one or more properties of the applied touch force with pre-stored reference properties or detected reference properties.

27. The procedure of claim 24, wherein each of the plurality of characters associated with each of the input members is assigned to the one or more pre-stored reference properties or the one or more detected reference properties.

28. The procedure of claim 27, wherein the one or more pre-stored reference properties include a first magnitude range comprising force magnitudes less than or equal to a first predetermined force magnitude, a second magnitude range comprising force magnitudes greater than the first predetermined force magnitude and less than a second predetermined force magnitude, and a third magnitude range comprising force magnitudes greater than or equal to the second predetermined force magnitude.

* * * * *

UNITED STATES PATENT AND TRADEMARK OFFICE
CERTIFICATE OF CORRECTION

PATENT NO. : 8,508,498 B2  
APPLICATION NO. : 12/430503  
DATED : August 13, 2013  
INVENTOR(S) : Conte et al.

Page 1 of 1

It is certified that error appears in the above-identified patent and that said Letters Patent is hereby corrected as shown below:

In the Specification

In Column 3, Line 46, delete "input sensors 30." and insert -- input sensors 50. --, therefor.

In Column 3, Line 66, delete "input sensors 40" and insert -- input sensors 50 --, therefor.

In Column 3, Line 66, delete "input controller 80," and insert -- input controller 60, --, therefor.

In Column 6, Line 22, delete "database 30" and insert -- data storage 30 --, therefor.

Signed and Sealed this  
Eighteenth Day of March, 2014

Michelle K. Lee  
*Deputy Director of the United States Patent and Trademark Office*